March 21, 1950   H. A. DUTCHER   2,501,382
PRODUCTION OF STYRENE AND HALOGENATED STYRENE
Filed March 21, 1946
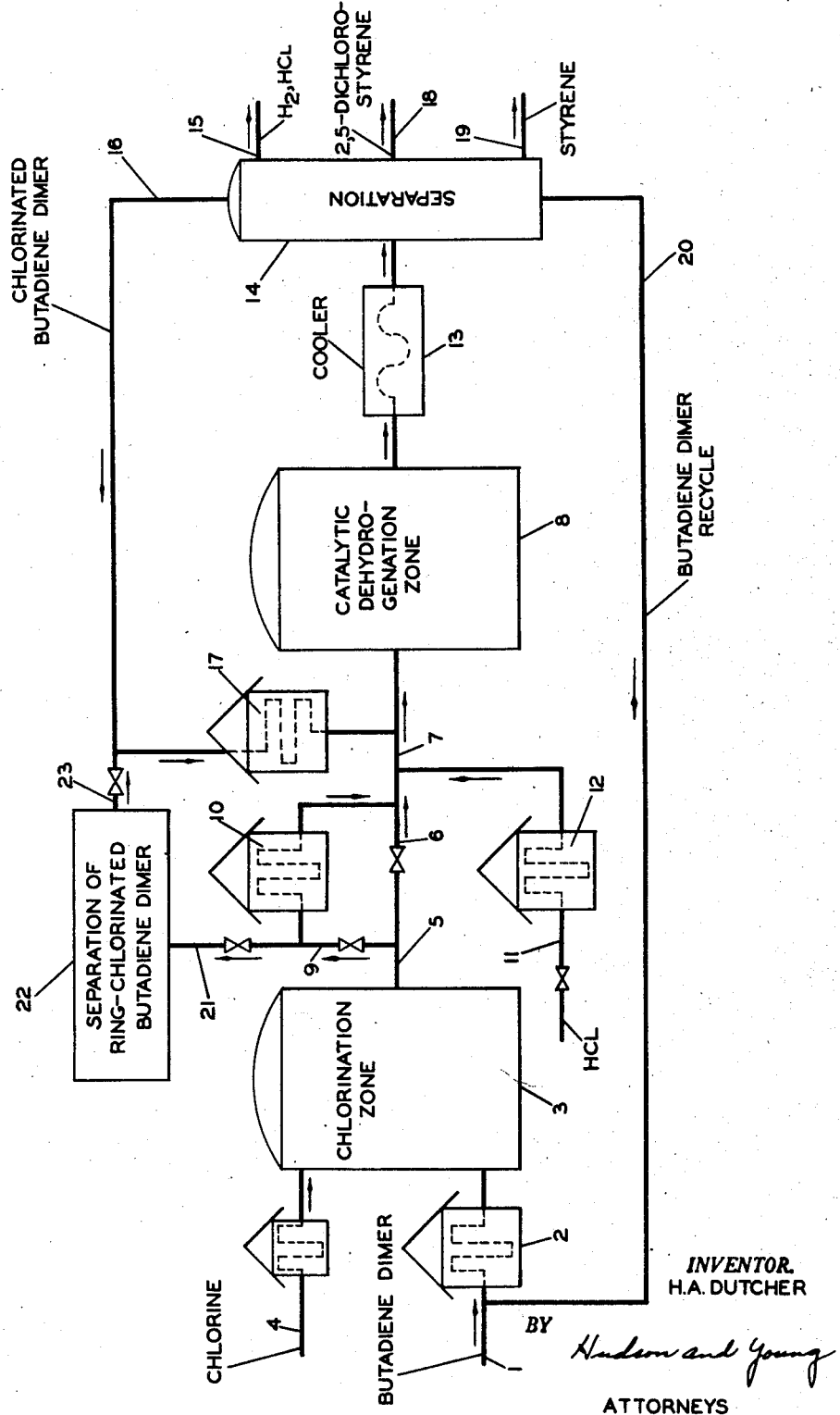
INVENTOR.
H.A. DUTCHER
BY
Hudson and Young
ATTORNEYS Patented Mar. 21, 1950

2,501,382

UNITED STATES PATENT OFFICE 2,501,382

PRODUCTION OF STYRENE AND HALOGENATED STYRENE

Harris A. Dutcher, Bartlesville, Okla., assignor to Phillips Petroleum Company, a corporation of Delaware Application March 21, 1946, Serial No. 656,105

7 Claims. (Cl. 260—650)

This invention relates to the production of styrene and of halogenated derivatives thereof wherein the halogen is on the benzene ring. More particularly it relates to an improved method of making chlorinated styrene derivatives. Still more particularly it relates to the production of styrene and halogenated derivatives thereof from butadiene dimer.

Styrene is an important chemical, being employed in large quantities in the manufacture of synthetic rubber by copolymerization with di-olefins, particularly butadiene. Recently it has been found that halogenated styrene derivatives, particularly chlorinated styrenes, and especially the specific compound 2,5-dichlorostyrene, give unusually valuable results when copolymerized with butadiene, styrene being present or absent, to make synthetic rubber. The resulting synthetic rubber is extremely long-wearing, especially when used in making tires. However, the cost of 2,5-dichlorostyrene has been extremely high. No simple and inexpensive way of making this compound has been available to the art.

The principal object of the present invention is to provide an improved method of preparing halogenated styrene derivatives, particularly chlorinated styrenes, and specifically 2,5-dichlorostyrene. Another object is to provide a process for the production of such compounds from butadiene dimer. Another object is to provide a simple and feasible method of converting butadiene dimer to 2,5-dichlorostyrene. Another object is to provide an improved method of making styrene. Another object is to provide a simple and economical method of converting butadiene dimer to styrene. Another object is to provide a process whereby butadiene dimer is converted to a mixture of 2,5-dichlorostyrene and styrene. Another object is to produce new chemical compounds comprising the mono-halo- and di-halo-ring-substituted derivatives of vinylcyclohex-ene-3. Numerous other objects of the present invention will be apparent to those skilled in the art from a consideration of this specification.

The drawing portrays diagrammatically one arrangement of equipment which may be employed for carrying out the process of my invention.

In its broadest aspect, my invention comprises halogenating butadiene cyclic dimer substitutively on the ring, and subjecting the resulting ring-halogenated butadiene dimer to treatment effecting conversion of the ring to a benzene ring. These two major steps of my process are carried out in different zones, inasmuch as different operating conditions are employed for each of the steps. In many cases the principal difference will be that an active catalyst for the second step is present during said step but is absent from the zone in which the halogenation is conducted.

Butadiene cyclic dimer is made by dimerizing butadiene-1,3 in known manner, for example as taught in U. S. Patent to G. G. Oberfell 2,355,392. Butadiene cyclic dimer is variously named as 1-vinylcyclohexene-2, 1-ethenyl-$\Delta^4$-cyclohexene, 4-vinylcyclohexene - 1 and 3 - vinylcyclohexene-1. For purposes of this disclosure I prefer to name it 1-vinylcyclohexene-3, the vinyl group being considered to be connected to the 1-position on the cyclohexene ring and the double bond being between the 3- and the 4-carbon atoms, as indicated in the following diagram:

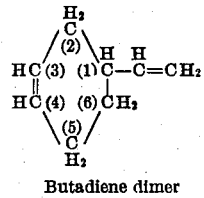

Butadiene dimer

In this specification and in the appended claims, the term "butadiene dimer" designates the compound having the above structural formula.

It is preferred to use the dimer in concentrated form and even more preferred to use dimer of substantially 100 per cent purity. Separation of the dimer from contaminants is well within the skill of the art so that the use of essentially pure dimer is very feasible.

The butadiene dimer is heated to vaporize it and bring it to a suitable temperature for entry into the halogenation zone. The vaporized dimer and the gaseous halogen may be separately introduced into the halogenation zone in any suitable manner. Generally it is preferred that the halogen be preheated to the temperature at which the halogenation is conducted. The reason for this is that the introduction of cold halogen may result in undesired additive halogenation.

In many cases it may be preferable to inject the halogen multipointwise into the halogenation zone, for example at a plurality of points longitudinally of the reaction zone where an elongated halogenation chamber is employed. Other expedients for keeping the temperature in the halogenation zone under control may be employed. For example, an inert gaseous diluent such as nitrogen may be injected into the halogenation zone with the halogen, with the vaporized dimer or with both or cold diluent may be injected along the reaction zone to control temperature therein. The diluent further serves to reduce the partial pressure in the subsequent dehydrogenation step. Usually suitable cooling means must be provided for removing the exothermic heat of halogenation. Such means may take the form of the usual cooling coils through which cooling water or other suitable coolant is circulated. Any other means of cooling the reaction zone or controlling the temperature therein may be employed.

The halogen employed is almost invariably chlorine. This is the cheapest and most readily available halogen. However, bromine and iodine may be employed. While, so far as I am aware, the ring-brominated and ring-iodinated styrenes have not been evaluated for synthetic rubber manufacture, they may prove to be highly valuable in the future for such use or as chemical intermediates.

Fluorine is not employed because, as is well recognized, fluorine is set apart from the other halogens and is anomalous in its chemical and physical behavior as compared to chlorine, bromine and iodine.

It is important that conditions in the halogenation step be so adjusted that substitution of halogen atoms on the ring of the butadiene dimer is the principal or substantially the only reaction, taking place to the substantial exclusion of additive halogenation which would defeat the purpose of my invention and would result in loss of valuable dimer and halogen by consumption in forming compounds incapable of yielding the desired end products.

The principal factor in determining whether substitutive halogenation or addition of halogen takes place is the halogenation temperature. It has been found that by employing a temperature of at least 750° F. substitution of halogen to the substantial exclusion of addition of halogen may be effected. The temperature may range from 750° F. upwardly to any suitable level. The upper limit is the temperature at which other reactions than the desired substitutive halogenation on the ring begin to occur to an appreciable extent. For instance if too high a temperature is maintained, splitting or cracking of the butadiene dimer or of the halogenation product thereof may take place. Furthermore after a certain temperature is attained the reaction may become entirely uncontrollable with the possibility of assuming explosive violence or of "flaming" with the production of large amounts of elemental carbon.

A halogenation temperature of between 750 and 800° F. is preferable. At a temperature within this range substitutive halogenation on the ring in the desired manner takes place to the substantial exclusion of additive halogenation, and the reaction does not become uncontrollable. Furthermore, undesired side reactions which would begin to take place at temperatures higher than 800° F. are kept from occurring to any appreciable extent.

The pressure maintained in the halogenation step is preferably such that vapor-phase conditions prevail. Ordinarily the pressure in this step will range from substantially atmospheric to moderately elevated superatmospheric pressures. Pressures above 50 pounds per square inch gage will seldom be employed.

Ordinarily no catalyst of any sort is present in the halogenation zone. However it is within the purview of my invention to employ a catalyst which catalyzes the desired substitutive chlorination on the ring of the butadiene dimer. In some cases actinic light may be provided within the halogenation zone for the purpose of expediting the desired substitutive halogenation.

The mechanism of the halogenation is not completely understood. However, the following equation illustrates the reaction contemplated:

(1)

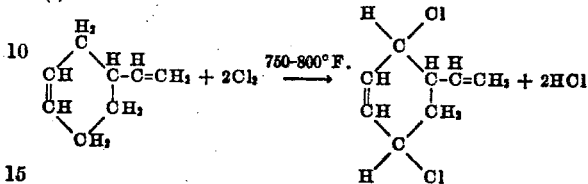

It will be seen from the equation that two atoms of chlorine replace two hydrogen atoms on different ring carbon atoms which ring carbon atoms have at least two hydrogen atoms thereon in the butadiene dimer before chlorination. The chlorine substitution takes place on the 2-carbon atom and on the 5-carbon atom, producing 1-vinyl-2,5-dichlorocyclohexene-3. It is believed that the chlorine is caused predominantly to substitute for hydrogen in the 2- and in the 5-position on the ring. However, I do not wish to preclude the possibility of some substitutive halogenation on the only other carbon atom in the ring which bears two hydrogen atoms, namely the carbon atom in the 6-position. Substitution in the 2- and 5-positions is highly desirable because the resulting compound upon dehydrogenation yields the desired 2,5-dichlorostyrene as will be shown below.

It is preferable to control the molar ratio of the reactants, namely butadiene dimer and halogen, introduced to the halogenation zone, within rather definite limits. It will be noted that the equation given above contemplates the reaction of one mol of butadiene dimer with two mols of chlorine. However, it is highly desirable to employ an excess of the butadiene dimer over the amount called for by the equation so that there is substantially no free halogen in the effluent from the halogenation zone. In order that the desired substitution of two chlorine atoms on the ring of the butadiene dimer may be the predominant or substantially the only reaction, the excess of butadiene dimer over the stoichiometric amount is preferably limited. In general, I prefer to employ a molar ratio of butadiene dimer to chlorine which is substantially greater than 1 to 2, i. e., the stoichiometric ratio, but not over 1.25 to 2. Use of a molar ratio of reactants within these limits brings about the production of the desired 2,5-ring chlorinated butadiene dimer as the principal reaction product.

Water should be rigorously excluded from the halogenation reaction zone. Even traces of water are highly objectionable because the desired reactions are interfered with. Water tends to promote the dedimerization of butadiene dimer, which is highly undesirable. Furthermore, the presence of water causes the reaction mixture to become extremely corrosive.

The halogenation effluent may be at a somewhat higher temperature than the temperature of the entering reactants, since the halogenation is a highly exothermic reaction and in spite of precautionary measures the temperature may rise appreciably as the reactants pass through the halogenation zone. Ordinarily, however, it is preferred that the effluent leave the halogenation zone at not above 800° F.

The second major step of the process of my invention involves dehydrogenation and/or dehydrohalogenation resulting in the formation of ring-halogenated styrene derivatives and/or styrene, respectively. The following equation illustrates the reactions contemplated:

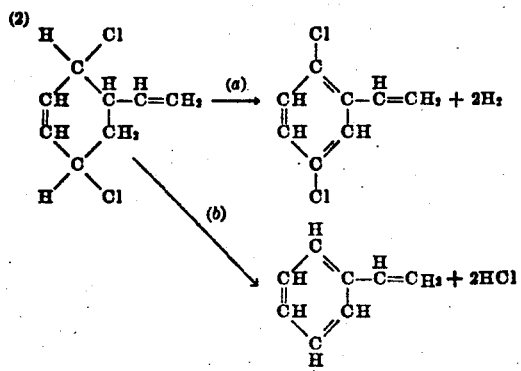

Ordinarily the second major step of my process is carried out by passing the entire halogenation effluent without separation and without substantial cooling and frequently with some heating, directly into a catalytic dehydrogenation zone wherein an active dehydrogenation catalyst is provided.

A highly active dehydrogenation catalyst should be employed in the second step so that the temperature required for the desired dehydrogenation will be below that at which thermal dehydrohalogenation takes place to an important or predominant extent. I prefer to use a dehydrogenation catalyst consisting essentially of alumina, preferably in highly active form, such as activated alumina, activated bauxite, etc., impregnated with a minor proportion of chromia ($Cr_2O_3$). Methods of making such dehydrogenation catalysts are well known and accordingly need not be set forth in detail. Instead of chromia I may less preferably use other active dehydrogenating metal oxides such as oxides of molybdenum, thorium, etc.

The temperature at which the dehydrogenation is conducted may range upwardly from 750° F. to any desired level. In many cases it will be advantageous to carry out this conversion at a temperature substantially above that employed in the halogenation in order that the desired dehydrogenation may proceed at a satisfactory rate. Ordinarily, however, it should not exceed 1000° F. because at temperatures above 1000° the desired dehydrogenation to dichlorostyrene may become a secondary reaction.

Dehydrogenation is an endothermic reaction so that suitable precautions must be taken to maintain the temperature and prevent an excessive temperature drop as the reactants pass through the dehydrogenation zone. The provision of such means is now well within the skill of the art. Suitable heaters for supplying heat in the required amount may be provided. In addition, the activity of the catalyst may be varied longitudinally of the dehydrogenation zone so that as the reactants traverse this zone they contact progressively more active catalyst, thereby maintaining conversion substantially constant despite the downward temperature gradient. In some cases the dehydrogenation step may be conducted at substantially the same temperature that was employed in the halogenation which is preferably between 750 and 850° F.

The pressure in the dehydrogenation zone will ordinarily range from substantially atmospheric to moderately superatmospheric. Pressure ranging from atmospheric to 50 pounds per square inch gage will ordinarily be employed. It will be obvious that vapor phase conditions will prevail in the dehydrogenation step.

Since dichlorostyrenes are much more valuable and much more in demand than styrene, I prefer that reaction (2)(a) be the principal or substantially the only reaction taking place in the dehydrogenation step. In ordinary practice, however, reaction (2)(b) will probably occur simultaneously therewith. This will result in the production of a mixture of styrene and dichlorostyrene which may be polymerized with butadiene to produce an improved tire type synthetic rubber.

A particularly advantageous mode of operating is to pass the total effluent from the halogenation step directly into the dehydrogenation zone. This eliminates the expense and complication attendant upon separation of the ring-chlorinated butadiene dimer from the halogenation effluent. Furthermore, this mode of operation is additionally advantageous since the hydrogen halide formed in the halogenation reaction passes into the dehydrogenation step where it serves to suppress dehydrochlorination, thus leading to the formation of the desired chlorinated styrenes rather than styrene itself.

The prevention of dehydrochlorination in the dehydrogenation zone may be aided by the introduction of additional hydrogen chloride to the feed to the dehydrogenation step. This extraneous hydrogen chloride is preferably preheated to the temperature of the entering feed before admixture therewith, in order to avoid lowering the temperature to any appreciable extent. The amount of extraneous hydrogen chloride thus added may vary within wide limits. An amount ranging upwardly to that already present in the halogenation effluent will be effective.

Water should be completely excluded from the dehydrogenation zone. Since the halogenation effluent is completely anhydrous, anhydrous conditions in the dehydrogenation zone may be readily attained by taking the usual steps to prevent introduction of water from other sources; the extraneous hydrogen chloride which may be introduced should be completely anhydrous. Any other stream such as the recycle stream hereinafter described should likewise be entirely free from water.

In some cases it may be deemed desirable to separate the vinyldichlorocyclohexene from the halogenation effluent and to dehydrogenate and/or dehydrohalogenate this material to give dichlorostyrene and/or styrene. This mode of operation may be especially advantageous when making styrene as the principal or sole end product, for the reason that the hydrogen chloride which would depress styrene formation in the manner described above is eliminated from the feed to the dehydrogenation and/or dehydrohalogenation step. If styrene alone is desired, the dehydrohalogenation of the vinyldichlorocyclohexene may be conducted in any known manner. For example, it may be carried out at low temperatures in the presence of strong bases which expedite the desired splitting off of two molecules of hydrogen chloride in accordance with reaction (2)(b) above.

The effluent from the catalytic dehydrogenation step is cooled in any suitable manner and treated in any desired manner to effect separation into its components. This separation may be accomplished by means of treatment with selective solvents to remove certain components, such as free hydrogen chloride. More usually, however, it will be conducted in a system of fractionation columns. It will be resolved into separate fractions containing the desired materials for withdrawal from the system and for recycle. For example, a gaseous fraction containing hydrogen and hydrogen chloride may be withdrawn. This may be treated to recover the hydrogen chloride thereof for addition to the feed to the dehydrogenation step. One or more fractions containing the 2,5-dichlorostyrene and the styrene may be separated. Another fraction containing ring-chlorinated butadiene dimer may be separated and recycled to the dehydrogenation step for conversion therein. Still another fraction of any butadiene dimer present in the dehydrogenation effluent may be separated and recycled to the halogenation step.

It is highly desirable to quench the dehydrogenation effluent with a suitable liquid in order to effect substantially immediate cooling to a low temperature and thereby minimize undesired reactions such as polymerization. It is especially advantageous to employ as the quenching liquid a hydrocarbon such as benzene or hexane which can be readily separated from the reaction products by distillation. The quench liquid may also serve as a solvent for the hydrogen halide. As will be obvious, water is not preferred as the quenching medium because of corrosion and because it makes it necessary to dry the recycle streams.

If any mono-chlorinated dimer is formed in the chlorination step, it may be dehydrogenated in the dehydrogenation step to form a mono-chlorostyrene. This is not so valuable a material as dichlorostyrene, however, it may be recovered from the dehydrogenation effluent and employed for any desired purpose.

Should any mono-chlorinated butadiene dimer appear in the dehydrogenation effluent, it may be recovered as a separate fraction and returned either to the dehydrogenation zone and dehydrogenated to monochlorostyrene or to the chlorination zone for additional chlorination to give the dichlorinated butadiene dimer.

The styrenes, and particularly the chlorinated styrenes such as 2,5-dichlorostyrene, are peculiarly apt to polymerize in the recovery steps and upon being allowed to stand. For example, 2,5-dichlorostyrene polymerizes rapidly to a solid mass upon standing at ordinary atmospheric temperature. It is within the purview of my invention to maintain any suitable polymerization inhibitor in contact with the styrenes during the separation steps and to admix a suitable proportion of such inhibitor with the product styrene and chlorinated styrene. An example of such an inhibitor is tertiary butyl catechol.

Referring to the drawing, butadiene dimer is fed to the system via line 1, passes through preheater 2 wherein it is vaporized and heated to the desired temperature for entry into the chlorination zone 3. Preheated to a suitable temperature, chlorine gas is fed to zone 3 separately via line 4. The chlorination effluent may pass directly via lines 5, 6 and 7 into the catalytic dehydrogenation zone 8. If desired, a portion or all of the chlorination effluent may be passed by line 9 through heater 10 for imparting additional heat to the feed to zone 8. Hydrogen chloride from an extraneous source may be introduced via line 11, being preheated before introduction by means of heater 12. The effluent from zone 8 passes through any suitable cooling means 13 and then to separation system 14 which is indicated schematically. The effluent may be separated into a gaseous fraction of hydrogen and hydrogen chloride taken off by line 15, a fraction of ring-chlorinated butadiene dimer which is recycled via line 16, being heated by heater 17, before introduction into the dehydrogenation feed. Another fraction of 2,5-dichlorostyrene may be taken off via line 18. A fraction of styrene may be withdrawn by line 19. A fraction of butadiene dimer may be withdrawn via line 20 and recycled to the incoming butadiene dimer feed flowing in line 1.

If desired, the chlorination effluent may be passed by lines 9 and 21 to separation unit 22 which is indicated schematically. The ring-chlorinated butadiene dimer may be separated in unit 22 and passed via line 23 and heater 17 into the catalytic zone 8 which may function in this case as a dehydrogenation and/or dehydrochlorination zone.

*Example*

Butadiene dimer is vaporized and preheated to a temperature of about 750° F., and the vapors are passed into a horizontally disposed glass cylinder within which a temperature of 750° F. is maintained. Chlorine gas is separately preheated to the desired temperature and introduced at a series of points along the length of the reactor. Butadiene dimer and chlorine are introduced to the reactor in an external mol ratio of 1.2:2. The entire effluent from the chlorination reactor is passed directly into a vertical catalyst chamber containing $Cr_2O_3$ (10–15 per cent) on alumina pellets and maintained at a temperature of 900° F. by means of an electric heating coil. A contact time of about 1 second is maintained in this dehydrogenation zone. The effluents therefrom are cooled by a direct quench with benzene, and fractionated to recover styrene and 2,5-dichlorostyrene as the principal products of the process.

So far as I am aware, the ring-substituted derivatives of vinylcyclohexene-3 produced in the halogenation step are new chemical compounds. These compounds comprise the mono-halo- and the di-halo-ring-substituted derivatives of vinylcyclohexene-3. The di-halo-substituted derivatives will comprise those compounds wherein halogen replaced hydrogen in the 2,5-positions, in the 2,6-positions and possibly in the 5,6-positions. The mono-halo-substituted compounds are those wherein halogen has replaced hydrogen in any one of the three positions, viz., the 2-, 5-, or 6-position. The above compounds are valuable as chemical intermediates. For example, they may be converted to styrene and ring-halogenated styrenes as shown in the foregoing. Of particular value are the chlorinated derivatives such as 1-vinyl-2,5-dichlorocyclohexene-3, 1-vinyl-2-chlorocyclohexene-3, 1-vinyl-5-chlorocyclohexene-3, and 1-vinyl-6-chlorocyclohexene-3.

Under certain conditions the tri-halo-ring-substituted derivatives of vinylcyclohexene-3 may be formed in the halogenation step. An example of such a derivative is 1-vinyl-2,5,6-trichlorocyclohexene-3. Upon dehydrogenation in accordance with this invention these compounds may be converted to the corresponding trihalostyrenes. The trihalostyrenes, such as the trichlorostyrenes, are very valuable materials being especially suitable for production of synthetic resins and rubber-like materials.

I claim:
1. The process which comprises continuously introducing butadiene dimer to a chlorination zone, separately continuously introducing chlorine to said zone, the molar ratio of said butadiene dimer to said chlorine being greater than 1 to 2, maintaining said chlorination zone at a temperature within the range of from 750° F. up to that at which other reactions than the desired substitutive chlorination on the ring begin to occur to an appreciable extent, at a pressure such that vapor phase conversion takes place, to form vinyl dichlorocyclohexene-3, withdrawing the resulting effluent, passing same without separation and without cooling directly into a dehydrogenation zone and there contacting same with an active dehydrogenation catalyst effective under the conditions prevailing to accomplish removal of hydrogen from the ring and conversion of said ring to a benzene ring, maintaining said dehydrogenation zone at a temperature substantially above that employed in said chlorination zone but not over 1000° F. and at a pressure such that vapor phase conditions prevail, cooling the dehydrogenation effluent, and separating therefrom a fraction comprising dichlorostyrene.

2. The process which comprises introducing butadiene dimer and chlorine to a chlorination zone, the molar ratio of said butadiene dimer to said chlorine being greater than 1 to 2, maintaining said chlorination zone at a temperature within the range of from 750° F. up to that at which other reactions than the desired substitutive chlorination on the ring begin to occur to an appreciable extent, at a pressure such that vapor phase conversion takes place, to form vinyl dichlorocyclohexene-3, passing said vinyl dichlorocyclohexene-3 into a dehydrogenation zone and there contacting same with an active dehydrogenation catalyst effective under the conditions prevailing to accomplish removal of hydrogen from the ring and conversion of said ring to a benzene ring, maintaining said dehydrogenation zone at a temperature within the range of from 750° F. up to 1000° F. and at a pressure such that vapor phase conditions prevail, and separating from the dehydrogenation effluent a fraction comprising dichlorostyrene.

3. The process of claim 2 wherein said molar ratio of butadiene dimer to chlorine is greater than 1 to 2 but not over 1.25 to 2, and said chlorination zone is maintained at between 750 and 800° F.

4. The process of claim 2 wherein said dehydrogenation catalyst comprises alumina impregnated with a minor proportion of chromia.

5. The process which comprises introducing butadiene dimer and chlorine to a chlorination zone, the molar ratio of said butadiene dimer to said chlorine being greater than 1 to 2, maintaining said chlorination zone at a temperature within the range of from 750° F. up to that at which other reactions than the desired substitutive chlorination on the ring begin to occur to an appreciable extent, at a pressure such that vapor phase conversion takes place, to form vinyl dichlorocyclohexene-3, withdrawing the resulting effluent, passing same without separation and without cooling directly into a dehydrogenation zone and there contacting same with an active dehydrogenation catalyst effective under the conditions prevailing to accomplish removal of hydrogen from the ring and conversion of said ring to a benzene ring, maintaining said dehydrogenation zone at a temperature within the range of from 750° F. up to 1000° F. and at a pressure such that vapor phase conditions prevail, and separating from the dehydrogenation effluent a fraction comprising dichlorostyrene.

6. The process which comprises continuously introducing butadiene dimer to a chlorination zone, separately continuously introducing chlorine to said zone, the molar ratio of said butadiene dimer to said chlorine being substantially greater than 1 to 2 but not over 1.25 to 2, maintaining said chlorination zone at between 750 and 800° F., at a pressure such that vapor phase conversion takes place, to form vinyl dichlorocyclohexene-3, withdrawing the resulting effluent, passing same without separation and without cooling directly into a dehydrogenation zone and there contacting same with an active dehydrogenation catalyst effective under the conditions prevailing to accomplish removal of hydrogen from the ring and conversion of said ring to a benzene ring, maintaining said dehydrogenation zone at a temperature substantially above that employed in said chlorination zone but not over 1000° F. and at a pressure such that vapor phase conditions prevail, cooling the dehydrogenation effluent, and separating said effluent into a fraction of unconverted ring-chlorinated butadiene dimer, at least one fraction containing 2,5-dichlorostyrene and styrene, and a fraction of butadiene dimer, heating said fraction of unconverted ring-chlorinated butadiene dimer to the dehydrogenation temperature and recycling same to said dehydrogenation zone, and recycling said fraction of butadiene dimer to said chlorination zone.

7. The process of claim 6 wherein extraneous hydrogen chloride is introduced into said chlorination effluent as it passes into said dehydrogenation zone in an amount such as to substantially prevent dehydrochlorination in said dehydrogenation zone.

HARRIS A. DUTCHER.

REFERENCES CITED

The following references are of record in the file of this patent:

UNITED STATES PATENTS

| Number | Name | Date |
|---|---|---|
| 1,221,382 | Schmidt et al. | Apr. 3, 1917 |
| 2,278,527 | Rust et al. | Apr. 7, 1942 |
| 2,290,758 | Levine et al. | July 21, 1942 |
| 2,382,038 | Bruson | Aug. 14, 1945 |

FOREIGN PATENTS

| Number | Country | Date |
|---|---|---|
| 268,722 | Germany | Dec. 29, 1913 |
| 343,116 | Great Britain | Feb. 16, 1931 |